United States Patent [19]

Prakken

[11] 4,348,851

[45] Sep. 14, 1982

[54] PACKING MACHINE FOR THE PRODUCTION OF FILLED SEALED BAGS

[76] Inventor: Bouwe Prakken, Spijkerlaan 9, 3471 EG Kamerik, Netherlands

[21] Appl. No.: 165,617

[22] Filed: Jul. 3, 1980

[30] Foreign Application Priority Data

Jul. 5, 1979 [NL] Netherlands .......................... 795262

[51] Int. Cl.³ .................................. B65B 57/08
[52] U.S. Cl. ............................... 53/75; 53/507; 53/552
[58] Field of Search .......... 53/76, 75, 67, 552, 53/551, 507, 508

[56] References Cited

U.S. PATENT DOCUMENTS

| | | | |
|---|---|---|---|
| 2,618,814 | 11/1952 | Paton et al. | 53/75 X |
| 2,657,510 | 11/1953 | Lewis | 53/75 |
| 3,027,695 | 4/1962 | Leasure | 53/552 X |
| 3,482,373 | 12/1969 | Morris | 53/552 X |
| 3,589,100 | 6/1971 | Konars et al. | 53/76 X |

*Primary Examiner*—James F. Coan
*Attorney, Agent, or Firm*—Finnegan, Henderson, Farabow, Garrett & Dunner

[57] ABSTRACT

Disclosed is a packaging machine which forms, fills, and seals bags in vertical orientation, and includes a heat sealing and severing jaw mechanism located below a vertical forming and filling tube. One of the sealing jaws includes a defective package detector which responds to resistance to pressure exerted on the filled package.

5 Claims, 3 Drawing Figures

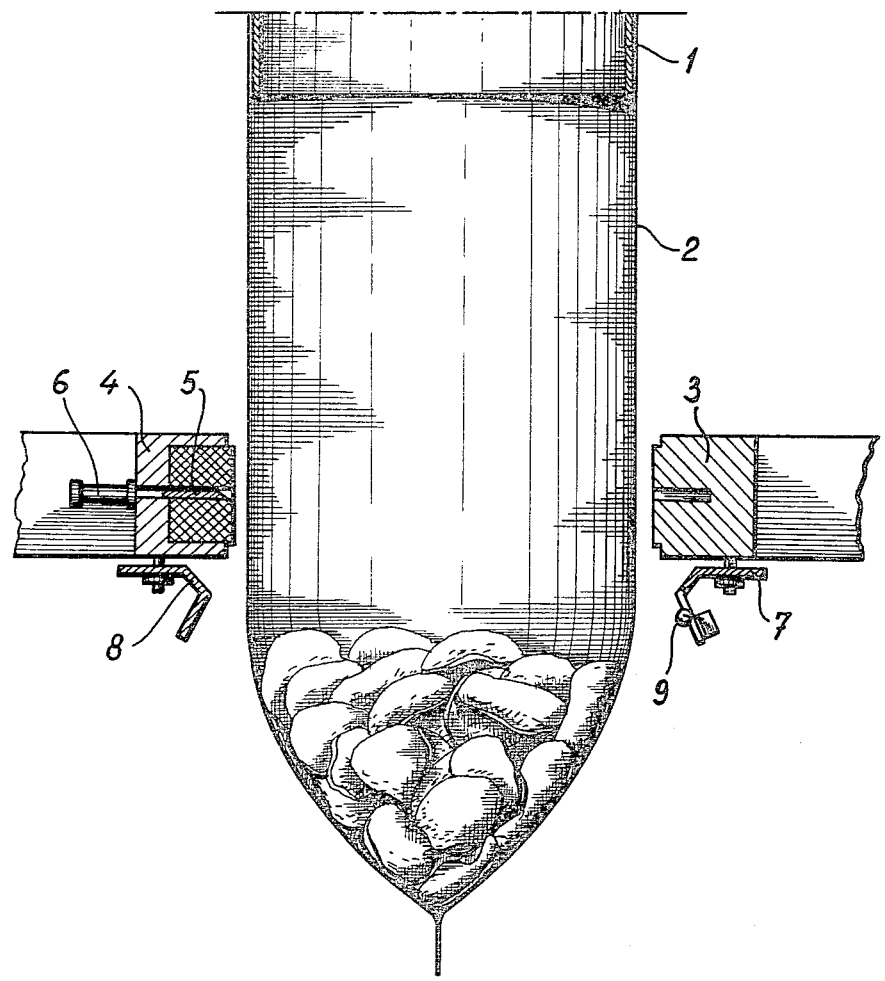

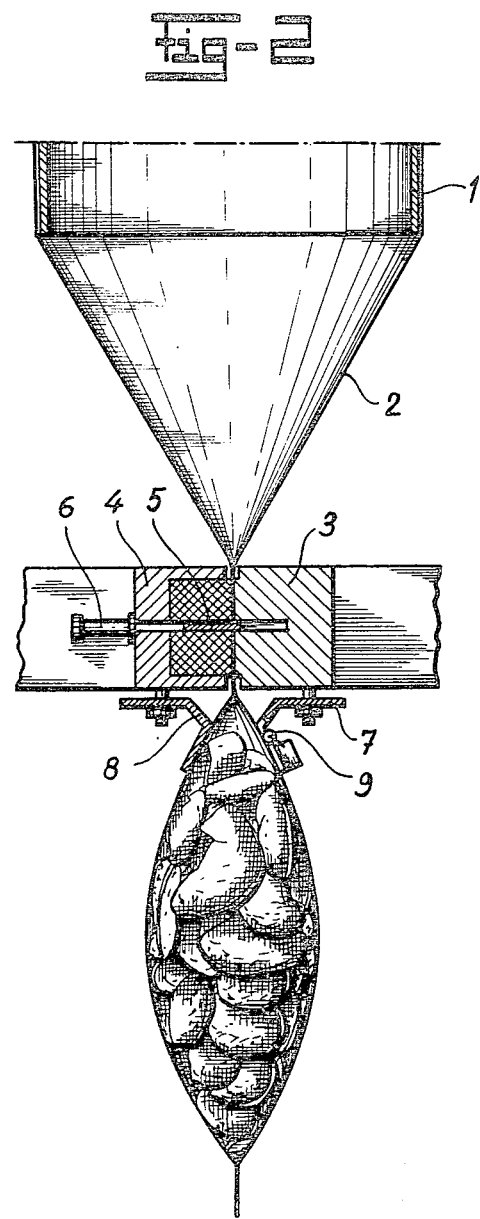

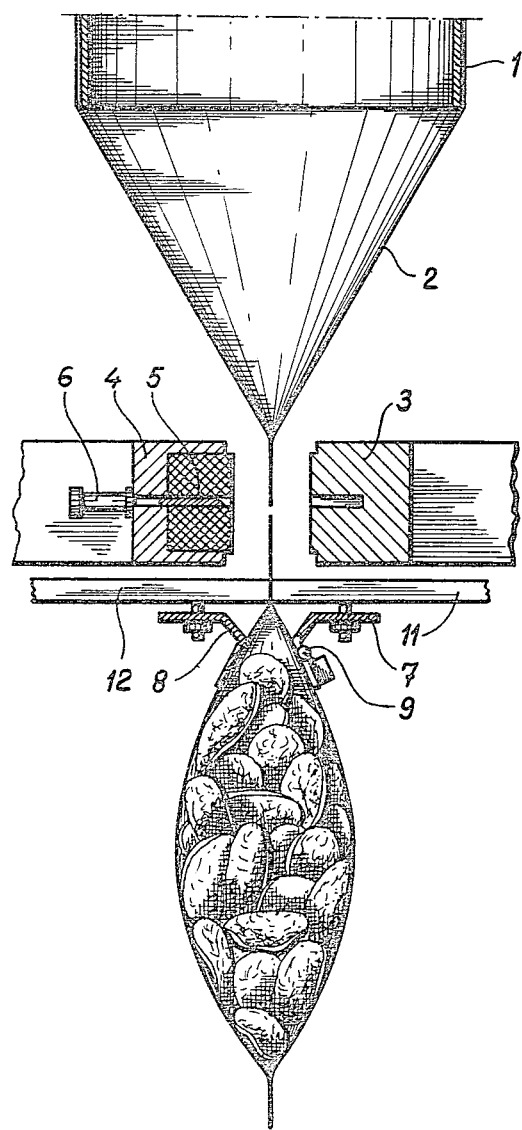

PACKING MACHINE FOR THE PRODUCTION OF FILLED SEALED BAGS

The invention relates to a packing machine for the production of filled sealed bags, said machine comprising a feeding pipe, means for forming a tube of film material surrounding said pipe, sealing jaws for forming transverse seams in said tube of film material, said sealing jaws being arranged at a location beyond said feeding pipe, and cutting means for severing said transverse seams.

Nowadays quite a number of food-stuffs is packed in heat sealed bags. A well known example thereof are the fried potato chips. Filling boxes with such bags may be performed automatically but it will then be necessary to remove not-closed or not properly closed bags before hand for it would be completely inacceptable to find pieces of cellophane, loose potato chips and the like in said boxes. Accordingly the filled sealed bags are often packed manually in said boxes.

From Dutch patent application No. 76,06232 filed on behalf of the same applicant there is known an apparatus for removing not-closed packing bags out of a row of filled sealed bags, said apparatus being provided with two conveyors arranged in superposed relation to each other the conveying planes of which facing each other are spaced at such a distance that a closed bag will be positively clamped between said planes whereas a not-closed bag will, however, not be clamped there between, said apparatus further being provided with means for removing the bags not clamped between said conveyors.

In practice such an apparatus has proved to be appropriate. Such an apparatus has however the drawback, that the not-closed or leaking bags are only removed at a late stage. Usually the leaks will be caused by a wrong adjustment or another failure of the machine used for filling and packing. Upon detecting a number of leaks the filling-packing machine will be stopped; the interruptions thus caused may, however, lead to considerable production losses. Moreover, the known apparatus for removing not-closed or leaking bags constitutes a separate mechanism entailing relatively high costs.

The object of the invention is now to avoid the above-mentioned drawbacks and to provide a machine of the type indicated above by means of which leaking bags may be detected in an early stage thus reducing the production losses to a minimum.

According to the invention the above-mentioned packing machine is therefore characterized in that beyond said sealing jaws there are provided means for exerting pressure on a closed bag and means for detecting the resistance experienced upon exerting said pressure.

This detecting means may comprise a switch mounted on a pressure exerting means, said switch being connected to a device for supplying a warning signal and/or for stopping the packing machine.

The switch may supply a mechanical, electric or pneumatic operating signal.

The construction of the machine may be very simple if said pressure exerting means comprises two shoes each one of which is rigidly connected to a sealing jaw.

This solution may, however, entail the drawback that upon exerting pressure on the bags optional leaks might be kept tight by the sealing jaws, whereby the detection of such leaks would be circumvented. If such a situation would indeed occur regularly, then a somewhat more sophisticated construction would be preferred, such a construction including separate clamping means for clamping a bag while said pressure exerting means comprise two shoes each one of which is connected to said clamping means.

Furthermore there is the possibility that said pressure exerting means comprise two shows each one of which is connected to a sealing beam, so that it may reciprocate.

The invention will now be elucidated with a reference to the diagrammatical figures.

FIG. 1 shows a cross-section of a part of a packing machine during the filling operation.

FIG. 2 shows a corresponding cross-section while leakage testing is performed.

FIG. 3 shows a somewhat modified construction,

The machine represented in FIGS. 1 and 2 includes a feeding pipe 1 about which a tube 2 of film material has been formed. At some distance below said feeding pipe there are provided two sealing jaws 3,4 which may be moved towards each other and apart from each other and by means of which transverse seams may be made in the film tube. In FIG. 1 the film tube 2 has been closed at the lower end thereof by such a transverse seam.

The sealing jaw 4 has been provided with a knife 5, said knife being operable to be moved within said sealing jaw 4 by means of for instance an electromagnetic, pneumatic or hydraulic operating mechanism 6.

At the bottom of each one of said sealing jaws 3, 4 there has been rigidly mounted a pressing means 7 and 8 respectively. These means are destined to exert pressure on a filled bag closed by two transverse seams (and optionally a longitudinal seam).

To said pressing means 7 there is connected a switch 9 capable of supplying a signal when operated.

The operation of the machine is as follows:

Starting from the position shown in FIG. 1 there is fed a metered amount of product through the feeding pipe 1, in the film tube 2, said film tube being closed at the lower-end thereof. Thereupon the sealing jaws 3,4 are moved towards each other while, like shown in FIG. 2 a transverse seam will be formed said transverse seam including both the upper sealing seam of the lower most bag and the lower sealing seam of that part of the film tube present just above said bag. The knife 5 flinging forward with respect to the sealing jaw 4 will cause a cut to be formed in said seam and severe the filled closed bag from the film tube 2.

When the sealing jaws approach each other the pressing means 7,8 will come into engagement with the filled bag. In case of a well closed bag said bag will offer resistance to said pressing means thus causing the switch 9 to be operated. The signal given by this operation of the switch is transmitted electrically, pneumatically or mechanically to the packing machine whereby said machine remains in operation and no alarm is given.

In case the sealing jaws are also operable to be moved up and down in vertical direction the jaws may pull the film tube 2 down over a distance corresponding to the film length of the bag, where upon the jaws recede. As the result thereof the filled bag will dropped down for instance on a conveyor. The vertical transportation of the film tube may however also be caused by the application of separate means.

If contrary thereto the filled bag proves to be leaky the switch 9 will not be operated. The signal generated in this way may be used to stop the filling machine and/or to switch in a visible or audiable alarm or to operate a bowling nozzle for blowing away the defective bag.

The pressing means 7, 8 do not have to be mounted fixedly to the sealing jaws and may also be movable separately.

Furthermore it is possible to apply a set of separate clamping means by means of which the bag may be clamped somewhat below the upper seam. Although this construction is somewhat more sophisticated it may be prevented thereby that a leak present in the upper seam of the bag would not be detected because the leak will be kept tight by the sealing jaws per se. In the alternative embodiment of FIG. 3 these separate clamping means are indicated by the reference numerals 11 and 12, said clamping means being provided at a short distance below the sealing jaws. The pressing means 7,8 are connected to the clamping means 11,12. The leakage test of the bag with the aid of the pressing means 7,8 is performed in this instance when the clamping means 11,12 have reached the clamping position and the sealing jaws have receded (the position shown FIG. 3).

There is also conceivable a construction in which the pressing means are connected in reciprocating movement with the sealing jaws, while the knife 5 is only actuated after determination whether the bag is leaky or not with the aid of the pressing means in a slightly receding position of the sealing jaws.

These constructions have all in common that beyond the sealing jaws there have provided means for exerting pressure on a closed bag and that there has been provided means for detecting the resistance experienced upon exerting said pressure, whereby in the absence of such resistance the packing machine may be stopped and/or an alarm system may be switched in and/or the leaky bag may be removed.

I claim:

1. A packing machine for packaging a product in bags of sealable material, comprising a fill pipe, means for forming a tube of sealable material surrounding said pipe, sealing jaws for forming end seals on said tube thereby forming a sealed bag, and detecting means for detecting leaks in said bags, said detecting means including pressure means for exerting pressure on a bag after it has been sealed by said sealing jaws, said detecting means also including a switch operable in response to little or no resistance to said pressure means when exerting pressure on said bag to detect a defectively sealed bag.

2. The packing machine according to claim 1, wherein said switch is connected to a device for supplying a warning signal and/or for stopping the packing machine.

3. The packing machine according to claim 1 or 2, said pressure exerting means comprising a pair of shoes each of which is rigidly connected to a respective one of the sealing jaws.

4. The packing machine according to claim 1 or 2, including separate clamping means for clamping a bag after it has been sealed, said pressure exerting means comprising a pair of shoes connecting to said clamping means.

5. The packing machine according to claim 1 or 2, said sealing jaws being reciprocable, said pressure exerting means including a pair of shoes connected to a respective one of said sealing jaws and reciprocable therewith.

* * * * *

UNITED STATES PATENT AND TRADEMARK OFFICE
CERTIFICATE OF CORRECTION

PATENT NO. : 4,348,851
DATED : September 14, 1982
INVENTOR(S) : BOUWE PRAKKEN

It is certified that error appears in the above—identified patent and that said Letters Patent is hereby corrected as shown below:

Cover sheet of issued patent, [30], change the number of the Netherlands Patent Application from "795262" to -- 7905262 --.

Signed and Sealed this

Twelfth Day of April 1983

[SEAL]

Attest:

GERALD J. MOSSINGHOFF

Attesting Officer    Commissioner of Patents and Trademarks